United States Patent [19]

Steinert et al.

[11] 4,002,813

[45] Jan. 11, 1977

[54] INJECTION OF CATALYSTS INTO A POLYMERIZATION AUTOCLAVE

[75] Inventors: Robert Bruce Steinert, Staten Island, N.Y.; William Arthur Schuessler, Rivervale, N.J.

[73] Assignee: Dart Industries, Inc., Los Angeles, Calif.

[22] Filed: Aug. 16, 1974

[21] Appl. No.: 497,977

[52] U.S. Cl. .................................. 526/61; 526/86; 526/88
[51] Int. Cl.² ...................... C08F 2/00; C08F 10/02
[58] Field of Search ............... 260/94.9 R, 94.9 P; 526/61, 86, 88

[56] References Cited

UNITED STATES PATENTS

| | | | |
|---|---|---|---|
| 3,399,185 | 8/1968 | Schappert ................. | 260/94.9 R |
| 3,405,115 | 10/1968 | Schappert et al. ........... | 260/94.9 R |
| 3,450,800 | 6/1969 | Smith et al. ............... | 260/94.9 P |
| 3,577,224 | 5/1971 | Hess et al. ................ | 260/94.9 R |
| 3,657,210 | 4/1972 | Minkhorst ................. | 260/94.9 P |
| 3,692,763 | 9/1972 | Van Saane et al. .......... | 526/88 |
| 3,719,643 | 3/1973 | Knight ..................... | 260/94.9 R |
| 3,812,090 | 5/1974 | Peters ..................... | 260/94.9 R |
| 3,876,602 | 4/1975 | Calvert et al. ............. | 260/94.9 P |
| 3,956,256 | 5/1976 | Mercx ..................... | 526/88 |

*Primary Examiner*—Alan Roller
*Attorney, Agent, or Firm*—Arthur S. Collins; Bryant W. Brennan; Fred S. Valles

[57] ABSTRACT

The catalyst stream used for regulating high pressure polymerization reactions of monoolefins such as ethylene can be supplied in a positive, clean and accurately controllable fashion by delivering it through a separate conduit which terminates in an orifice tip located within and substantially coplanar with the entry port of the monomer stream into the reaction zone. The subject technique simplifies start-up as well as maintenance of good temperature control throughout the polymerization process.

7 Claims, 4 Drawing Figures

INJECTION OF CATALYSTS INTO A POLYMERIZATION AUTOCLAVE

BACKGROUND OF THE INVENTION

1. Field of the Invention

This invention relates to improved methods and apparatus for feeding a catalyst into a polymerization autoclave. The subject invention finds particular utility and offers outstanding advantages in conducting continuous high pressure processes for polymerizing ethylene in the presence of free-radical generating catalysts.

2. Description of the Prior Art

Because of the powerful influence exerted by the catalysts used therein, the successful operation of polymerization processes is often critically dependent upon the accuracy and reproducibility of methods used in handling and feeding such catalysts and the maintenance of correct and controllable levels of catalyst activity during the polymerization process. The practical problems encountered in attaining such uniform and reproducible results are usually accentuated by the small concentrations at which catalysts are normally used and the consequent low feed rates at which they are supplied to the polymerization process. For example, in the widely commercialized high pressure method of polymerizing ethylene, the preferred free-radical generating catalysts are seldom employed in concentrations of over 1000 parts per million parts of total monomer by weight, and no more than 100 parts per million are usually needed when polymerization temperatures reach the conventional steady state levels, exceeding 100° C.

U.S. Pat. No. 2,897,183 to Christl and Roedel outlines the more prominent techniques which have been used commercially for high pressure polymerization of ethylene. Said patent also adequately describes representative conditions for operating the so-called continuous, stirred autoclave technique for the high pressure polymerization of ethylene. As indicated in U.S. Pat. No. 2,897,183, such a well-mixed autoclave reactor affords about the closest practical approach to a constant environment high pressure process for polymerizing ethylene. Thus, in this technique, once start-up procedures are over and "light-off" (i.e. active, free-radical induced polymerization rate) has been attained, a substantially steady state, continuous process is desirably maintained with nearly constant operating temperatures and pressures, and steady monomer feed rates and polymer production rates.

Reaction conditions and flow rates are usually regulated to accomplish from about 5 to about 25% conversion of monomer to polymer per pass through the stirred autoclave, involving average residence times therein which can run from less than 1 minute to several minutes. After the product stream leaves the autoclave, it is continually processed to remove solid polymer product and the unreacted monomer is recycled back to the polymerization autoclave, undergoing suitable purification, drying, recompression and/or cooling treatments in route.

Accordingly, it will be seen that one "light-off" of the polymerization reaction has occurred the maintenance of the steady state operation desired in this continuous, stirred autoclave process will depend largely upon striking the proper heat balance between the exothermic heat of polymerization of the ethylene fraction reacting and the heat capacity of the reaction mass, a most significant contribution to which is made by the fraction of ethylene which is merely heated up from its inlet temperature while passing through unreacted. In practice the usual approach to regulating this extent of polymerization and striking this heat balance has been through modification of the catalyst feed stream to the process. For example, automatic feed back control based upon temperatures sensors located in the polymerization autoclave is often used for this purpose. However, the high operating pressures and the minute amounts of catalyst involved increase the dangers of encountering flow irregularities and instabilities which might interrupt, undermine or interfere with the intended control system.

In spite of these inherent problems in handling and feeding catalyst streams, most continuous, stirred autocalve polymerizations appear to have been conducted heretofore by merely injecting the catalyst stream or streams directly into the autoclave, e.g. as shown in U.S. Pat. No. 2,728,753 and U.S. Pat. No. 2,964,515. On the other hand, some prior art patents such as U.S. Pat. No. 2,475,643 and U.S. Pat. No. 2,897,183 (discussed above) have suggested introducing the catalyst stream into a monomer stream approaching the autoclave so as to premix the two components before they actually enter the polymerization zone of the autoclave. Although this latter approach tends to improve the distribution of the catalyst and minimize the occurence of hot spots in the polymerization zone, it increases the danger of premature polymerization and consequent fouling of the feed lines with deposits of solid polymer and also tends to reduce the sensitivity and responsiveness of any automatic feed back control systems based upon temperature sensors located in the polymerization zone.

SUMMARY OF THE INVENTION

The primary object of this invention is to provide a reliable and easily controllable method of feeding a potent but relatively small volume component such as a catalyst stream directly to a high pressure chemical reaction zone. Other objects are to provide such positive feed methods and associated apparatus which minimize fouling difficulties in the injection feed system and insure even delivery and distribution and efficient, orderly utilization of the key component or catalyst.

A more specific object is to provide improved methods and apparatus for use in polymerizing ethylene at high pressures by the continuous, stirred autoclave technique, sometimes referred to as the constant environment, high pressure process for polymerizing ethylene.

Still further objects of this invention will be evident from the detailed description which follows.

We have now discovered that the above objects can largely be realized by feeding a fluid catalyst stream separately through a high pressure conduit directly to the high pressure polymerization zone and releasing same into said zone through a small discharge port at the edge of said zone said port being located within an entry port of substantially larger cross-sectional area through which the monomer stream to be polymerized is continuously being released at substantially the same planar edge of said zone. Preferably, the catalyst stream is supplied in the form of a solution of the active ingredient in a suitable, substantially inert solvent so that said solution is relatively stable at ambient temperatures and somewhat beyond. The catalyst feed conduit should be sized to insure significant linear flow velocities of the catalyst stream therethrough at the designed feed rates and the final discharge port should be substantially smaller in diameter so as to inject the catalyst solution in the form of a liquid jet, peripherally surrounded by the entering monomer stream being released at the same planar edge position of the enclosed polymerization space.

With regard to apparatus forms of the present invention, it will be obvious that the basic concept can be embodied in a considerable variety of differently detailed constructions due to the wide range of equivalents available in the field of mechanical design. However, in order to provide a full understanding of the invention, representative mechanical arrangements will be described, with greatest emphasis being placed upon those designs which are particularly advantageous for use with high pressure, stirred polymerization autoclaves.

DETAILED DESCRIPTION AND PREFERRED EMBODIMENTS

In this detailed description and explanation of preferred embodiments, reference will be made to the accompanying drawings, in which.

Figure 1:
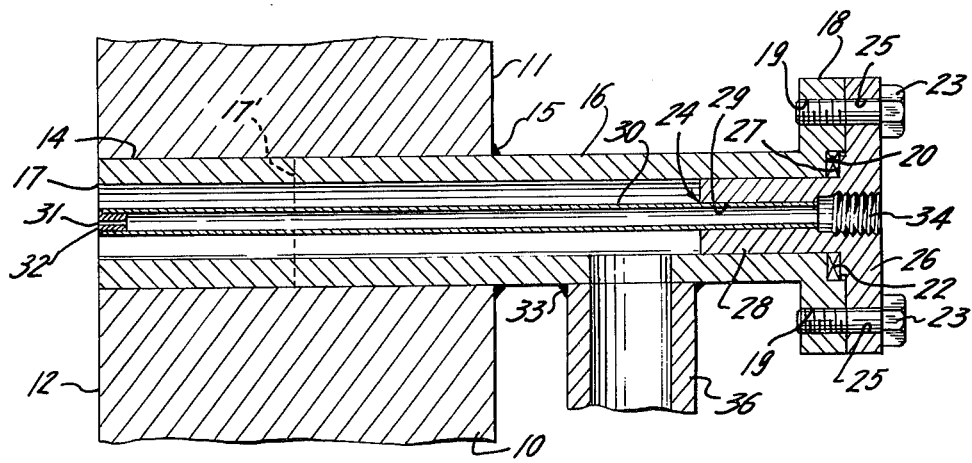
FIG. 1 is a simple cross-sectional view showing the basic relationship of catalyst and monomer injection elements mounted in a heavy wall segment of a reactor.

Referring now to FIG. 1, thick wall section 10 represents a portion of the enclosing wall of a high pressure reactor having an entry port 14 extending therethrough from outer face 11 to inner face 12. Heavy conduit 16 extends through port 14 and is mounted by a pressure tight weld 15 at outer face 11 of the reactor wall, and preferably so that its discharge end 17 is substantially even with inner face 12. Optionally, conduit 16 could terminate part way through entry port 14 in thick wall section 10, e.g. at dotted line 17'. The opposite end of conduit 16 carries an integral heavy flange 18 containing a concentric ring of threaded openings 19 therein. Flange 18 also has a step seat 20 on its outer face immediately surrounding the bore opening through conduit 16. Ring shaped gasket 22 fits neatly into step seat 20 and forms a pressure seal when catalyst feed conduit assembly 24 is mounted thereon by means of bolts 23 extending through holes 25 in outer flange 26. Flange 26 is an integral part of the catalyst feed delivery conduit and includes shoulder section 27 on its inner face for forming a compression seal against gasket 22 and extended mandrel section 28 which fits inside the bore opening of conduit 16. The central portion of mandrel section 28 is bored out longitudinally at 29 to form a socket-like holder for the length of heavy pressure tubing 30 which serves as the catalyst feed delivery conduit. Tubing 30 is tightly and rigidly mounted in mandrel section 28 by closely fitting and welding same into said socket-like bore 29. The discharge end of tubing 30 is substantially even with the inner face 12 of wall section 10 and is equipped with a pressure tight plug fitting 32 having a fine bore discharge orifice 31 therein. A suitable connecting opening 34 is provided in outer flange 26 for use in joining bore 29 to the pressure feed system which supplies the catalyst stream used in the process. Also, compressed monomer supply conduit 36 is joined into the lateral wall of heavy conduit 16 at a point between the outer surface 11 of reactor wall 10 and the heavy mandrel section 28, e.g. by welding at 33. Thus, it will be seen that this arrangement insures that the catalyst feed stream will be discharged in a positive manner directly into the main reaction zone of the reactor at the peripheral edge thereof and will be completely enclosed and surrounded by the stream of monomer being released simultaneously at the same peripheral edge location from the discharge end 17 of conduit 16 or from entry port 14 itself if conduit 16 ends at 17'.

Figure 2:
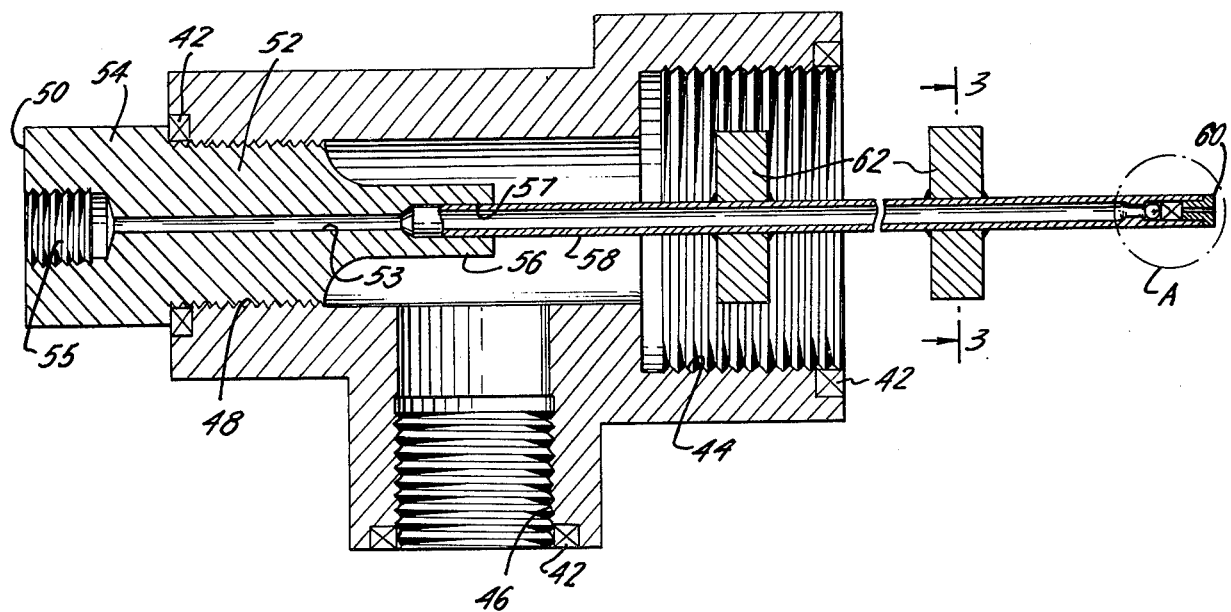
FIG. 2 is a cross-sectional view of a separately fabricated and assembled composite injector ready for attachment to a threaded boss extension on an inlet opening in a reactor wall.
Figure 3:
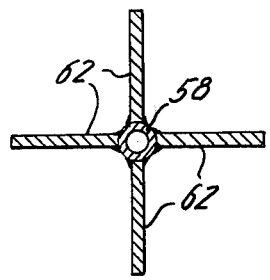
FIG. 3 is a cross-sectional view taken along line 3—3 of FIG. 2.
Figure 2A:
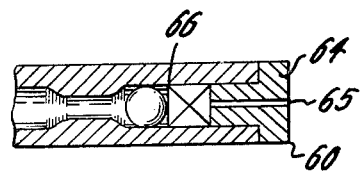
FIG. 2A is an enlargement of end portion A of FIG. 2.

In FIGS. 2, 2A and 3, the embodiment depicted is a separate, preassembled, composite injector designed for mounting on a high pressure reactor by means of a threaded boss thereon connecting to an inlet opening of known dimensions leading through the reactor wall. This injector has self-contained connections for separately joining same to the respective pressurized feed systems for catalyst and monomer, once it has been mounted on the reactor. The preassembled, composite injector of this embodiment comprises a generally tee-shaped main housing 40 having pressure tight connecting means on each of the three branches thereof, e.g. gasketed ring seats 42 and associated threaded elements for use in compressing said gasketed seats in cooperation with respective mating threaded elements. Thus, threaded element 44 is sized to mate with the aforementioned threaded extension boss on the reactor (not shown) and threaded element 46 is adapted to mate with a connector leading to the pressurized monomer feed system. (not shown)

Already assembled in mating pressure tight fashion with the final threaded element 48, is heavy socket connector block 50 through which the catalyst feed stream is admitted. This connector block 50 has a threaded midsection 52, an outer head or cap section 54 and a hub or sleeve extension 56 on the opposite end. An internal bore 53 runs through the main body of said connector block from the threaded opening 55 in the cap end to the cylindrical well 57 in the extended hub or sleeve portion 56. Rigidly mounted and pressure sealed in the well 57 of hub or sleeve portion 56 is an extended length of high pressure tubing 58, the midportion of which is omitted in the representation depicted in FIG. 2. The overall length of said tubing 58 is such that its discharge end 60 will be substantially coplanar with the inner wall of the reactor after threaded element 44 has been made up tight with the mating extension boss on the reactor (not shown). At suitable intervals along tubing 58, rigid rib elements 62 are attached to help support and position the tubing 58 within the said extension boss and associated entry port (not shown) leading through the reactor wall. The span of these rib elements 62 will naturally be selected in accordance with the size of said entry port through the reactor wall.

As best shown in the enlargement of FIG. 2A, the discharge end portion (A) of tubing 58 may desirably be equipped with an end cap or plug 64 having a fine discharge port 65 therethrough. Also a ball type check valve 66 can be inserted inside the catalyst feed tube immediately adjacent to the end plug 64 in order to prevent fluids in the reactor from backing up into the catalyst feed tube in the case of any loss of pressure in the catalyst supply system.

In operating a pilot plant sized, stirred autoclave to polymerize ethylene with and without various comonomers, a direct comparison was made between the use of our composite injector constructed as described above and the pre-injection of the activator solution into the monomer stream before it enters the autoclave (as taught by the prior art.) In all cases the activator solutions consisted of between about 1 and about 10% by weight of the active free-radical generating catalyst dissolved in a suitable hydrocarbon solvent such as hexane. Typically in these runs, the autoclave pressures were in the 20,000 to 30,000 psi range and the target for peak polymerization temperature was set at a level between about 400° and about 500° F. In some runs, ethylene was essentially the only monomer (although fractions of a percent of such chain modifiers as hydrogen, propylene, butylenes, hexenes, etc. were usually added). In other runs from about 1 to 20% or more of various comonomers such as propylene, vinyl acetate, etc. were introduced along with the ethylene.

In all cases using the premix injection of the activator solution, flow irregularities and excessively wide savings in temperature were encountered so that reasonably safe, smooth operations could only be maintained by using the more dilute solutions (e.g. 1 to 2% of catalyst by weight). Even then, smooth start-ups were difficult to achieve with premix injectors since "light-offs" were often damped out due to partial plugging in the feed lines, necessitating washing them out and re-starting the run.

On the other hand, start-ups and "light-offs" were sure and steady with the injection method of this invention even with the more concentrated catalyst solutions, while continuous operation was much smoother with smaller variations in peak temperature and end product characteristics. Furthermore, much greater flexibility in operation was possible with the direct coplanar composite injectors of this invention. For example, multipoint injection of catalyst and monomer streams could be used without upsetting the control systems and with more efficient catalyst utilization being realized.

Although representative ethylene polymerization conditions have been mentioned hereinabove in order to provide a clearer picture of a specific, highly advantageous application for the present invention, it should be realized that the practical range of high pressure polymerization is much larger. For example, many other monomers and comonomers can be polymerized. Any of the wide variety of free radical type catalysts can be employed such as hydrogen peroxide, organic peroxides or peresters, tetraethyl lead, triethyl aluminum, etc., as well as the azo type catalysts. Pressures can range from 5,000 to 50,000 psi or more and temperatures from about 150° to about 350° C.

Accordingly, having thoroughly described the present invention and given preferred and illustrative embodiments and practical applications thereof, the scope of our invention is defined by the following claims.

We claim:

1. In a continuous process for conducting polymerization reactions under high pressure with the aid of a free-radical generating catalyst in an enclosed reaction space, the improvement which comprises releasing a highly pressurized fine liquid jet of catalyst internally into a separate compressed stream of monomer just as said stream of monomer discharges into said enclosed reaction space from its entry port through the enclosure wall surrounding said reaction space.

2. The improvement of claim 1 wherein ethylene is the principal monomer involved in the polymerization process, the operating pressure in the reaction space is at least 5,000 psi, the operating temperatures therein are at least about 150° C, the catalyst is supplied in solution in a suitable solvent and the size of the jet of catalyst solution as it is released into the stream of entering compressed ethylene is only a minor fraction of the cross-sectional area of said stream of compressed ethylene.

3. The improvement of claim 1 wherein ethylene enters said reaction space through more than one such entry port and a jet of the catalyst is released into the interior of each stream of ethylene just as it discharges into said enclosed reaction space.

4. The improvement of claim 2 wherein the catalyst is an organic peroxide, the solvent is a hydrocarbon liquid and the solution contains between about 1 and about 10% by weight of said catalyst.

5. The improvement of claim 2 wherein said reaction space is the interior of a large autoclave equipped with a mechanical mixing means.

6. The improvement of claim 2 wherein the catalyst is a peroxy compound and the relative rate at which it is supplied is adjusted automatically in response to temperature changes being sensed continuously at certain points within said reaction space, said response being biased to adjust said rate inversely to the direction of said temperature changes so as to limit the extent of said changes.

7. The improvement of claim 6 in which said temperature changes are sensed electrically and the resultant signals are fed back to suitable responsive rate adjusting means.

* * * * *

UNITED STATES PATENT AND TRADEMARK OFFICE
CERTIFICATE OF CORRECTION

PATENT NO. : 4,002,813
DATED : Jan. 11, 1977
INVENTOR(S) : Robert Bruce Steinert & William Arthur Schuessler It is certified that error appears in the above-identified patent and that said Letters Patent are hereby corrected as shown below:

Col. 1, line 62, change "one" to --once--

Col. 2, line 28, change "occu" to --occur--

Col. 5, lines 24 & 25, change "savings" to --swings--

Signed and Sealed this

Thirty-first Day of May 1977

[SEAL]

Attest:

RUTH C. MASON
Attesting Officer

C. MARSHALL DANN
Commissioner of Patents and Trademarks